(12) United States Patent
Tiirola et al.

(10) Patent No.: US 7,860,150 B2
(45) Date of Patent: Dec. 28, 2010

(54) APPARATUS, METHOD, AND COMPUTER PROGRAM PRODUCT PROVIDING IMPROVED UPLINK PILOT TRANSMISSION SCHEMES

(75) Inventors: Esa Tiirola, Kempele (FI); Kari Pajukoski, Oulu (FI)

(73) Assignee: Nokia Corporation, Espoo (FI)

( * ) Notice: Subject to any disclaimer, the term of this patent is extended or adjusted under 35 U.S.C. 154(b) by 876 days.

(21) Appl. No.: 11/789,731

(22) Filed: Apr. 24, 2007

(65) Prior Publication Data

US 2007/0248147 A1    Oct. 25, 2007

Related U.S. Application Data

(60) Provisional application No. 60/794,611, filed on Apr. 24, 2006.

(51) Int. Cl.
*H04B 1/00* (2006.01)
(52) U.S. Cl. .......................... 375/135; 370/491; 370/500
(58) Field of Classification Search ................. 375/132, 375/133, 135; 370/491, 500
See application file for complete search history.

(56) References Cited

U.S. PATENT DOCUMENTS

| 7,272,162 | B2 * | 9/2007 | Sano et al. | 375/135 |
| 7,421,041 | B2 * | 9/2008 | Khandekar et al. | 375/316 |
| 7,660,367 | B2 * | 2/2010 | Nishio et al. | 375/329 |
| 2006/0176859 | A1 * | 8/2006 | Lee et al. | 370/335 |
| 2008/0090528 | A1 * | 4/2008 | Malladi | 455/70 |

OTHER PUBLICATIONS

3GPP TR 25.814, V7.1.0, "3rd Generation Partnership Project; Technical Specification Group Radio Access Network; Physical layer aspects for evolved Universal Terrestrial Radio Access (UTRA)", (Release 7) (Sep. 2006).
3GPP TR 25.814, V1.2.2, "3rd Generation Partnership Project; Technical Specification Group Radio Access Network; Physical Layer Aspects for Evolved UTRA", (Release 7) (Mar. 2006).
3GPP TS 36.211, V1.0.0, "3rd Generation Partnership Project; Technical Specification Group Radio Access Network; Physical Channels and Modulation", (Release 8) (Mar. 2007).
3GPP TSG-RAN WG1 Meeting #44bis, R1-060784, "Orthogonal Pilot channel Structure for E-UTRA Uplink", NTT DoCoMo, Fujitsu, Mitsubishi Electric, NEC . . . ,Athens, Greece, Mar. 27-31, 2006.

(Continued)

*Primary Examiner*—Jean B Corrielus
(74) *Attorney, Agent, or Firm*—Harrington & Smith

(57) ABSTRACT

In one non-limiting aspect thereof, the exemplary embodiments of this invention provide a user equipment that includes a data processor; and a wireless transceiver configured to transmit uplink pilot signals during sub-bands and slots, wherein at least three blocks (LB1, LB2 and LB3) are reserved for pilot signals. LB1 and LB2 include in-band pilot signals transmitted using a dedicated pilot code. The wireless transceiver is further configured to transmit LB3 using a frequency hopping pattern and pilot code allocation that are based on a slot and a sub-band in which a first LB3 is transmitted. Thus, the code and hopping pattern of a scheduled user equipment are resource-specific (defined by an allocated resource), as opposed to being user equipment-specific.

25 Claims, 16 Drawing Sheets

OTHER PUBLICATIONS

3GPP TSG-RAN WG1 Meeting #44bis, R1-060785, "L1/L2 Control Channel Structure for E-UTRA Uplink", NTT CoCoMo, Fujitsu, Mitsubishi Electric . . . , Athens, Greece, Mar. 27-31, 2006.

3GPP TSG-RAN WG1 Meeting #44bis, R1-060787, "Frequency Domain Channel-Dependent Scheduling with Adaptive Transmission Bandwidth of Pilot Channel for CQI Measurement for E-UTRA Uplink", NTT DoCoMo,, Fujitsu, Mitsubishi Electric . . . , Athens, Greece, Mar. 27-31, 2006.

3GPP TSG-RAN WG1 Meeting #44bis, R1-060818, "Reference Signal Structure for EUTRA Uplink", Samsung, Athens, Greece, Mar. 27-31, 2006.

3GPP TSG-RAN WG1 Meeting #44bis, R1-060819, "L1/L2 Control signaling Multiplexing in Evolved UTRA Uplink", Samsung, Athens, Greece, Mar. 27-31, 2006.

3GPP TSG-RAN WG1 Meeting #44bis, R1-060831, "Considerations on uplink pilot design using CAZAC", NEC Group, Athens, Greece, Mar. 27-31, 2006.

3GPP TSG-RAN WG1 Meeting #44bis, R1-060847, "Considerations on Pilot Design for the LTE Uplink", Freescale Semiconductor, Inc., Athens, Greece, Mar. 27-31, 2006.

3GPP TSG-RAN WG1 Meeting #44bis, R1-060879, "Performance Comparison of Pilot/Reference Signal Structures for E-UTRA Uplink SC-FDMA", Agenda item: 10.2.1, Motorola, Mar. 27-31, 2006.

3GPP TSG-RAN WG1 Meeting #44bis, R1-060907, "Sounding channel for UL channel-dependent scheduling", Nortel, Athens, Greece, Mar. 27-31, 2006.

3GPP TSG-RAN WG1 Meeting #44bis, R1-060919, "Uplink pilot for channel quality measurement", LG Electronics, Athens, Greece, Mar. 27-31, 2006.

3GPP TSG-RAN WG1 Meeting #44bis, R1-060925, "Comparison of Proposed Uplink Pilot Structures For SC-OFDMA", Agenda Item: 10.2.1, Texas Instruments, Athens, Greece, Mar. 27-31, 2006.

3GPP TSG-RAN WG1 Meeting #44bis, R1-060972, "Pilot design for E-UTRA uplink", RITT, Athens, Greece, Mar. 27-31, 2006.

3GPP TSG-RAN WG1 Meeting #44bis, R1-060985, "Impacts of Uplink FDM Pilot Density", Huawei, Athens, Greece, Mar. 27-31, 2006.

3GPP TSG-RAN WG1 Meeting #44bis, R1-061094, "Text proposa on Orthogonal Pilot Channel Structure for E-UTRA Uplink", NTT DoCoMO, Panasonic, Ericsson, Fujitsu . . . , Athens, Greece, Mar. 27-31, 2006.

* cited by examiner

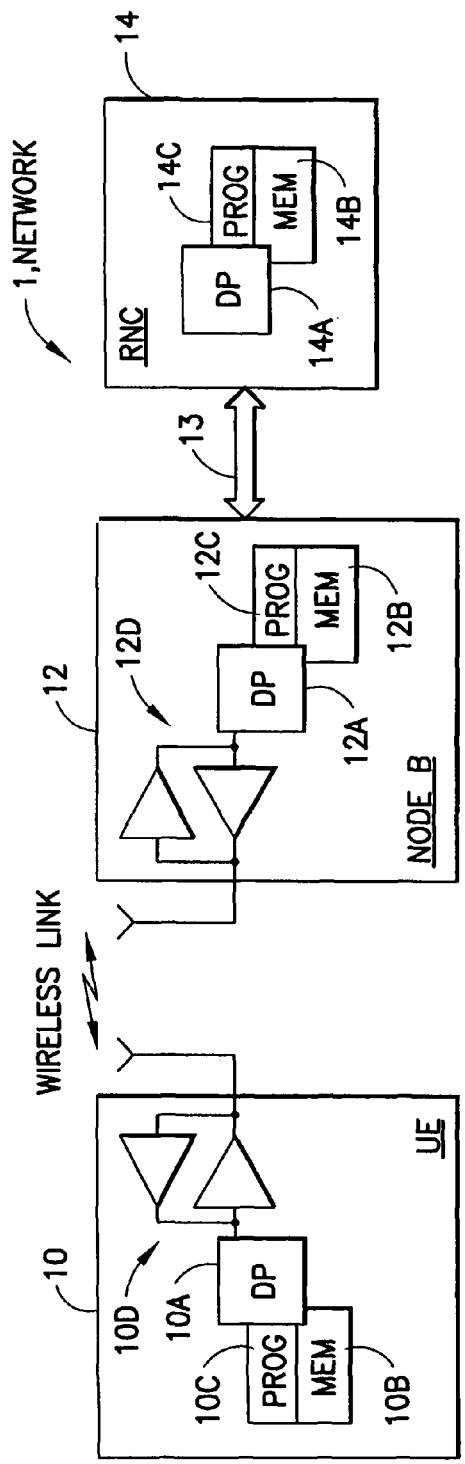

FIG.1

| PURPOSE | | OPTION 1 | OPTION 2 | OPTION 3 |
|---|---|---|---|---|
| CHANNEL ESTIMATION FOR DEMODULATION/DETECTION | IN CASE OF LOCALIZED UPLINK DATA TRANSMISSION | LOCALIZED FDMA | LOCALIZED FDMA | LOCALIZED FDMA FOR SB2 CDMA FOR SB1 |
| | IN CASE OF DISTRIBUTED UPLINK DATA TRANSMISSION | DISTRIBUTED FDMA | DISTRIBUTED FDMA AND/OR CDMA | CDMA |
| CHANNEL SOUNDING FOR UPLINK CQI ESTIMATION | | DISTRIBUTED FDMA | DISTRIBUTED FDMA AND/OR CDMA | CDMA FOR SB1 |

| SUB-BAND NUMBER | CODE NUMBER | SUB-FRAME NUMBER | | | |
|---|---|---|---|---|---|
| | | 1 | 2 | 3 | 4 |
| 1 | 1 | A | D | H | |
| | 2 | | | | |
| | 3 | | | | |
| | 4 | | | | |
| | 5 | | | | |
| | 6 | | | | |
| 2 | 1 | | G | | |
| | 2 | | | | |
| | 3 | | | | |
| | 4 | | | | |
| | 5 | | | | |
| | 6 | | | | |
| 3 | 1 | B | | C | C |
| | 2 | | | | |
| | 3 | | | | |
| | 4 | | | | |
| | 5 | | | | |
| | 6 | | | | |
| 4 | 1 | E | F | C | C |
| | 2 | | | | |
| | 3 | | | | |
| | 4 | | | | |
| | 5 | | | | |
| | 6 | | | | |

FIG.6

| HOPPING PATTERN NUMBER | SUB-BAND NUMBER OF SB2 | | |
|---|---|---|---|
| 1 | 1 | 1 | |
| | 2 | | 2 |
| 2 | 1 | | 1 |
| | 2 | 2 | |

FIG.7A

| HOPPING PATTERN NUMBER | SUB-BAND NUMBER OF SB2 | SUB-FRAME NUMBER | | | |
|---|---|---|---|---|---|
| | | 1 | 2 | 3 | 4 |
| 1 | 1 | 1 | | 1 | |
| | 2 | 2 | | 2 | |
| | 3 | | 3 | | 3 |
| | 4 | | 4 | | 4 |
| 2 | 1 | | 1 | | 1 |
| | 2 | | 2 | | 2 |
| | 3 | 3 | | 3 | |
| | 4 | 4 | | 4 | |

FIG.7B

| HOPPING PATTERN NUMBER | SUB-BAND NUMBER OF SB2 | SUB-FRAME NUMBER | | | |
|---|---|---|---|---|---|
| | | 1 | 2 | 3 | 4 |
| 1 | 1 | 1 | | | |
| | 2 | | 2 | | |
| | 3 | | | 3 | |
| | 4 | | | | 4 |
| 2 | 1 | | 1 | | |
| | 2 | 2 | | | |
| | 3 | | | | 3 |
| | 4 | | | 4 | |
| 3 | 1 | | | 1 | |
| | 2 | | | | 2 |
| | 3 | 3 | | | |
| | 4 | | 4 | | |
| 4 | 1 | | | | 1 |
| | 2 | | | 2 | |
| | 3 | | 3 | | |
| | 4 | 4 | | | |

FIG.7C

| HOPPING PATTERN NUMBER | SUB-BAND NUMBER OF SB2 | | | |
|---|---|---|---|---|
| 1 | 1 | 1 | | |
| | 2 | | 2 | |
| | 3 | | | 3 |
| 2 | 1 | | | 1 |
| | 2 | 2 | | |
| | 3 | | 3 | |
| 3 | 1 | | 1 | |
| | 2 | | | 2 |
| | 3 | 3 | | |

FIG.7D

| HOPPING PATTERN NUMBER | SUB-BAND NUMBER OF SB2 | SUB-FRAME NUMBER | | | |
|---|---|---|---|---|---|
| | | 1 | 2 | 3 | 4 |
| 1 | 1 | 1 | | | |
| | 2 | | 2 | | |
| | 3 | | | 3 | |
| | 4 | | | | 4 |
| 2 | 1 | | 1 | | |
| | 2 | 2 | | | |
| | 3 | | | | 3 |
| | 4 | | | 4 | |
| 3 | 1 | | | 1 | |
| | 2 | | | | 2 |
| | 3 | 3 | | | |
| | 4 | | 4 | | |
| 4 | 1 | | | | 1 |
| | 2 | | | 2 | |
| | 3 | | 3 | | |
| | 4 | 4 | | | |

FIG.8A

| SUB-BAND NUMBER | CODE NUMBER | SUB-FRAME NUMBER | | | |
|---|---|---|---|---|---|
| | | 1 | 2 | 3 | 4 |
| 1 | 1 | A | D | H | |
| | 2 | | | | |
| | 3 | | | | |
| | 4 | | | | |
| | 5 | | | | |
| | 6 | | | | |
| 2 | 1 | | G | | |
| | 2 | | | | |
| | 3 | | | | |
| | 4 | | | | |
| | 5 | | | | |
| | 6 | | | | |
| 3 | 1 | B | | C | C |
| | 2 | | | | |
| | 3 | | | | |
| | 4 | | | | |
| | 5 | | | | |
| | 6 | | | | |
| 4 | 1 | E | F | C | C |
| | 2 | | | | |
| | 3 | | | | |
| | 4 | | | | |
| | 5 | | | | |
| | 6 | | | | |

FIG.8B

| HOPPING PATTERN NUMBER | PILOT CODE 1 | 2 | 3 | 4 | 5 | 6 |
|---|---|---|---|---|---|---|
| 1 | A 1 | 5 | 9 | 13 | 17 | 21 |
| 2 | G 2 | D 6 | C 10 | 14 | 18 | 22 |
| 3 | B 3 | F 7 | H 11 | 15 | 19 | 23 |
| 4 | E 4 | 8 | 12 | 16 | 20 | 24 |

BASIC PRINCIPLE:
BOTH HOPPING PATTERN AND PILOT CODE ARE TIED TO THE ALLOCATED RESOURCE ⟶ NO NEED FOR ADDITIONAL SIGNALING

FIG.8C

| HOPPING PATTERN NUMBER | PILOT CODE 1 | 2 | 3 | 4 | 5 | 6 |
|---|---|---|---|---|---|---|
| 1 | A 1 | 5 | 9 | 13 | 17 | 21 |
| 2 | G 2 | D 6 | C 10 | 14 | 18 | 22 |
| 3 | B 3 | F 7 | H 11 | 15 | 19 | 23 |
| 4 | E 4 | 8 | 12 | 16 | 20 | 24 |

AVAILABLE RESOURCES FOR OUT-BAND/OUT-TIME PILOT

FIG.9A

| | ON-TIME ALLOCATIONS OF PILOT RESOURCES | | | | PRE-RESERVED RESOURCES | |
|---|---|---|---|---|---|---|
| HOPPING PATTERN NUMBER | PILOT CODE 1 | 2 | 3 | 4 | 5 | 6 |
| 1 | A 1 | 5 | 9 | 13 | 17 | 21 |
| 2 | G 2 | D 6 | C 10 | 14 | 18 | 22 |
| 3 | B 3 | F 7 | H 11 | 15 | 19 | 23 |
| 4 | E 4 | 8 | 12 | 16 | 20 | 24 |

FIG.9B

- AN EXAMPLE OF HOPPING PATTERN GENERATION:
  - L=4;
  - z=SUB-FRAME INDEX ( 1... L)
  - HOPPING PATTERN (z)=REM(z−1+(y−1),L)+1

| SUB-BAND NUMBER OF SB2 | SUB-FRAME NUMBER | | | | |
|---|---|---|---|---|---|
| | 1 | 2 | 3 | ... | 4 |
| 1 | 1 | | | | |
| 2 | | 2 | | | |
| 3 | | | 3 | | |
| 4 | | | | | 4 |

HOPPING PATTERN, y = 1

| SUB-BAND NUMBER OF SB2 | SUB-FRAME NUMBER | | | | |
|---|---|---|---|---|---|
| | 1 | 2 | 3 | ... | 4 |
| 1 | | | | | 1 |
| 2 | 2 | | | | |
| 3 | | 3 | | | |
| 4 | | | 4 | | |

HOPPING PATTERN, y = 2

FIG.10A

| SUB-BAND NUMBER OF IN-BAND PILOT | SUB-BAND NUMBER OF ACTIVE TTI | SUB-FRAME NUMBER | | | |
|---|---|---|---|---|---|
| | | 1 | 2 | 3 | 4 |
| 1 | 1 | 1 | | | |
| | 2 | | 2 | | |
| | 3 | | | 3 | |
| | 4 | | | | 4 |
| 2 | 1 | | 1 | | |
| | 2 | 2 | | | |
| | 3 | | | | 3 |
| | 4 | | | 4 | |

SOME MODIFICATIONS TO THE BASIC PATTERN TO PROVIDE BETTER CHANNEL ESTIMATION SUPPORT FOR DIFFERENT BW ALLOCATIONS

PILOT RESOURCES, SB1

| HOPPING PATTERN | PILOT CODE | | | | | |
|---|---|---|---|---|---|---|
| NUMBER | 1 | 2 | 3 | 4 | 5 | 6 |
| 1 | | 5 | 9 | 13 | 17 | 21 |
| 2 | | 6 | 10 | 14 | 18 | 22 |
| 3 | | 7 | 11 | 15 | 19 | 23 |
| 4 | | 8 | 12 | 16 | 20 | 24 |

AVAILABLE OUT-BAND/OUT-TIME RESOURCES

FIG.12A

PILOT RESOURCES, SB2

| HOPPING PATTERN | PILOT CODE | | | | | |
|---|---|---|---|---|---|---|
| NUMBER | 1 | 2 | 3 | 4 | 5 | 6 |
| 1 | | 5 | 9 | 13 | 17 | 21 |
| 2 | | 6 | 10 | 14 | 18 | 22 |
| 3 | | 7 | 11 | 15 | 19 | 23 |
| 4 | | 8 | 12 | 16 | 20 | 24 |

AVAILABLE OUT-BAND/OUT-TIME RESOURCES

| SUB-BAND NUMBER | CODE NUMBER | SUB-FRAME NUMBER | | | |
|---|---|---|---|---|---|
| | | 1 | 2 | 3 | 4 |
| 1 | 1 | A | D | H | |
| | 2 | A | D | H | |
| | 3 | | | | |
| | 4 | | | | |
| | 5 | | | | |
| | 6 | | | | |
| 2 | 1 | | G | | |
| | 2 | | G | | |
| | 3 | | | | |
| | 4 | | | | |
| | 5 | | | | |
| | 6 | | | | |
| 3 | 1 | B | | C | C |
| | 2 | B | | C | C |
| | 3 | | | | |
| | 4 | | | | |
| | 5 | | | | |
| | 6 | | | | |
| 4 | 1 | E | F | C | C |
| | 2 | E | F | C | C |
| | 3 | | | | |
| | 4 | | | | |
| | 5 | | | | |
| | 6 | | | | |

FIG.14

| HOPPING PATTERN NUMBER | PILOT CODE | | | | | | | |
|---|---|---|---|---|---|---|---|---|
| | ANT1 ANT2 | | ANT1 ANT2 | | ..... | | | |
| | 1 | 2 | 3 | 4 | 5 | 6 | 7 | 8 |
| 1 | 1 | 5 | 9 | 13 | 17 | 21 | 25 | 29 |
| 2 | 2 | 6 | 10 | 14 | 18 | 22 | 26 | 30 |
| 3 | 3 | 7 | 11 | 15 | 19 | 23 | 27 | 31 |
| 4 | 4 | 8 | 12 | 16 | 20 | 24 | 28 | 32 |

FIG.15

162 — TRANSMIT UPLINK PILOT SIGNALS DURING SUB-BANDS AND SLOTS, WHEREIN AT LEAST THREE BLOCKS (LB1, LB2 AND LB3) ARE RESERVED FOR PILOT SIGNALS, WHEREIN LB1 AND LB2 COMPRISE IN-BAND PILOT SIGNALS TRANSMITTED USING A DEDICATED PILOT CODE

164 — TRANSMIT LB3 USING A FREQUENCY HOPPING PATTERN AND PILOT CODE ALLOCATION THAT ARE BASED ON A SLOT AND A SUB-BAND IN WHICH A FIRST LB3 IS TRANSMITTED

FIG.16

APPARATUS, METHOD, AND COMPUTER PROGRAM PRODUCT PROVIDING IMPROVED UPLINK PILOT TRANSMISSION SCHEMES

CROSS-REFERENCE TO RELATED APPLICATIONS

This patent application claims priority under 35 U.S.C. §119(e) from Provisional Patent Application No. 60/794,611, filed Apr. 24, 2006, the disclosure of which is incorporated by reference herein in its entirety.

TECHNICAL FIELD

The exemplary embodiments of this invention relate generally to wireless communication systems, apparatus and methods and, more specifically, relate to wireless communication system techniques for enabling frequency and time domain channel dependent scheduling in a Frequency Division Multiple Access (FDMA) system.

BACKGROUND

The following additional abbreviations are defined as follows:
3GPP third generation partnership project
BW bandwidth
CAZAC constant amplitude zero autocorrelation
CDMA code division multiple access
CP cyclic prefix
CQI channel quality indication
DL downlink (Node-B to UE)
FDM frequency division multiplex
FDMA frequency division multiple access
IRC interference rejection combining
LTE long term evolution of UTRAN
MIMO multiple input/multiple output
Node B base station
PAR peak-to-average ratio
RAN radio access network
RNC radio network controller
SB1 short block #1 (the first pilot symbol)
SB2 short block #2 (the second pilot symbol)
SIMO single input/multiple output
TDM time division multiplex
TTI transmission time interval
UE user equipment, such as a mobile station or mobile terminal
UL uplink (UE to Node B)
UTRAN-LTE universal terrestrial radio access network-LTE (may be referred to as 3.9G)

Standardization discussions have taken place related to the UTRAN-LTE UL reference signal structure. Reference in this regard may be had to 3GPP RAN1 #44 bis Meeting, Athens, Greece, 27-31 Mar. 2006.

Three different options generally shown in FIG. 2 have been considered. There are assumed to be two pilot blocks, SB1 and SB2, in each UL sub-frame. Thus far, the assumption has been that the CDMA-based approach (CAZAC with cyclic shifts) is applied for both pilot blocks (SB1, SB2). A Distributed FDMA approach has also been considered.

One problem that arises concerns how to combine the in-band pilot transmission and out-band/out-time pilot transmission (e.g., channel sounding for UL CQI estimation) in such a way that both channel estimation and CQI estimation perform adequately. Additional concerns relate to reference signal design.

Issues that arise and should be addressed include the following: flexibility in terms of bandwidth allocation (this contributes to the gain potential of the channel dependent scheduling); PAR properties; channel tracking capability (how many simultaneous users can be maintained in the sounding mode); the required DL signaling; and implementation complexity.

A conventional approach is illustrated in FIG. 3A for an example of four sub-frames and 12 frequency sub-bands. Two approaches have been considered in this regard: both pilot blocks SB1, SB2 are transmitted using the entire scheduling BW (sub-bands 3-6, as shown in FIG. 3A); and one of the pilot blocks is transmitted using the signal bandwidth, while the other pilot block is transmitted using the scheduling bandwidth (or with the system bandwidth).

In both approaches the pilot code(s) are user-specific.

General reference may be had to 3GPP TR 25.814 V1.2.2, "3rd Generation Partnership Project; Technical Specification Group Radio Access Network; Physical Layer Aspects for Evolved UTRA (Release 7)," Apr. 4, 2006.

SUMMARY

In an exemplary aspect of the invention, a method includes: transmitting uplink pilot signals during sub-bands and slots, wherein at least three blocks (LB1, LB2 and LB3) are reserved for pilot signals, wherein LB1 and LB2 include in-band pilot signals transmitted using a dedicated pilot code; and transmitting LB3 using a frequency hopping pattern and pilot code allocation that are based on a slot and a sub-band in which a first LB3 is transmitted.

In another exemplary aspect of the invention, a computer program product includes program instructions embodied on a tangible computer-readable medium. Execution of the program instructions results in operations including: transmitting uplink pilot signals during sub-bands and slots, wherein at least three blocks (LB1, LB2 and LB3) are reserved for pilot signals, wherein LB1 and LB2 include in-band pilot signals transmitted using a dedicated pilot code; and transmitting LB3 using a frequency hopping pattern and pilot code allocation that are based on a slot and a sub-band in which a first LB3 is transmitted.

In a further exemplary aspect of the invention, a user equipment includes: a data processor; and a wireless transceiver configured to transmit uplink pilot signals during sub-bands and slots, wherein at least three blocks (LB1, LB2 and LB3) are reserved for pilot signals, wherein LB1 and LB2 include in-band pilot signals transmitted using a dedicated pilot code, and to transmit LB3 using a frequency hopping pattern and pilot code allocation that are based on a slot and a sub-band in which a first LB3 is transmitted.

In another exemplary aspect of the invention, a user equipment includes: processing means; and transmitting means for transmitting uplink pilot signals during sub-bands and slots, wherein at least three blocks (LB1, LB2 and LB3) are reserved for pilot signals, wherein LB1 and LB2 comprise in-band pilot signals transmitted using a dedicated pilot code, and for transmitting LB3 using a frequency hopping pattern and pilot code allocation that are based on a slot and a sub-band in which a first LB3 is transmitted.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 1 shows a simplified block diagram of various electronic devices that are suitable for use in practicing the exemplary embodiments of this invention;

FIG. 2 shows different options for pilot transmission based on prior proposals;

FIG. 3A depicts a conventional pilot transmission technique;

FIG. 3B illustrates a non-limiting example of the pilot transmission technique in accordance with the exemplary embodiments of this invention;

FIG. 6 is a sub-band/sub-frame diagram showing various codes (e.g., 1-6) associated with sub-frames and sub-bands, and is useful for explaining rules for pilot transmission;

FIGS. 7A, 7B, 7C and 7D pertain to various examples of hopping patterns;

FIGS. 8A, 8B and 8C pertain to the out-band pilot for scheduled (active) users;

FIGS. 9A and 9B pertain to the out-time and out-band pilot for non-scheduled users;

FIGS. 10A and 10B pertain the generation of the hopping patterns;

FIG. 11 shows a sub-frame format and is useful in explaining the roles of SB1 and SB2;

FIGS. 12A and 12B are useful in explaining the use of SB1 as an out-band pilot;

FIGS. 13A and 13B are useful for comparing UE-specific hopping patterns (FIG. 13A) and resource-specific hopping patterns (FIG. 13B);

FIGS. 14 and 15 pertain to the use of pilot signals in a MIMO system; and

FIG. 16 depicts a flowchart illustrating one non-limiting example of a method for practicing the exemplary embodiments of this invention.

DETAILED DESCRIPTION

Figure 4:
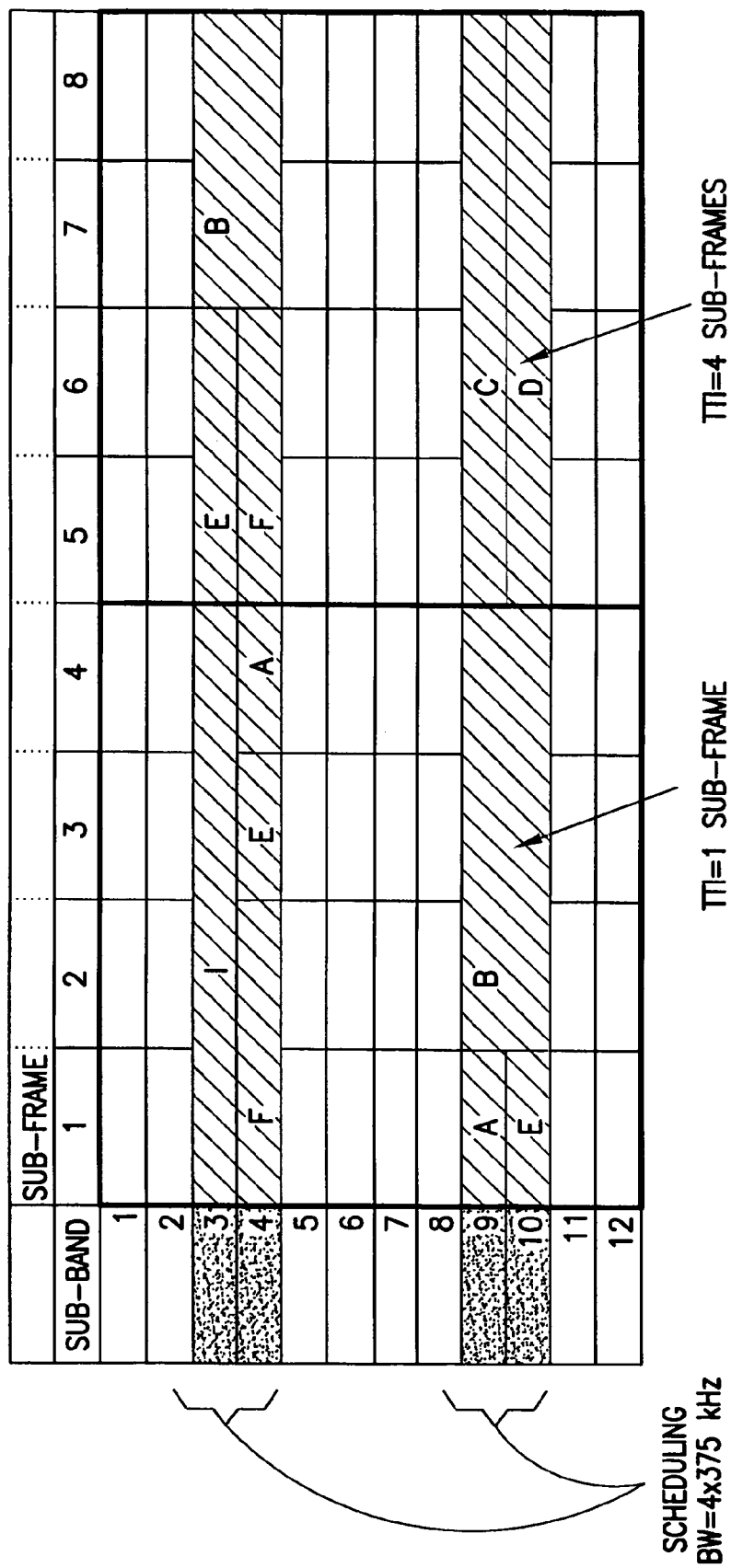
FIG. 4 shows an example of data allocation in a scheduled UL system.

There are several problems inherent in the UL pilot block proposals made thus far. For example, the considered transmission scheme allows that the scheduling BW covers only adjacent sub-bands. Furthermore, channel estimation does not work well, at least for the reason that the division of the in-band pilot and out-band pilot is not balanced. In addition, the proposed technique suffers from a limited channel tracking capability due to a lack of orthogonal codes.

The exemplary embodiments of this invention may generally be seen to pertain to the UTRAN LTE UL, and, more specifically, to pilot signal transmission for use with out-band and out-time pilots used for frequency and time domain channel dependent scheduling. Note that the pilot signal transmission technique in accordance with the exemplary embodiments of this invention may be used with all three options listed in FIG. 2.

In accordance with the exemplary embodiments of this invention the pilot code (both in-band and out-band) is tied to the used resource, i.e., there is no user-specific pilot. Further, the out-band pilot is transmitted using a predetermined frequency hopping pattern.

Figures 3A, 3B:
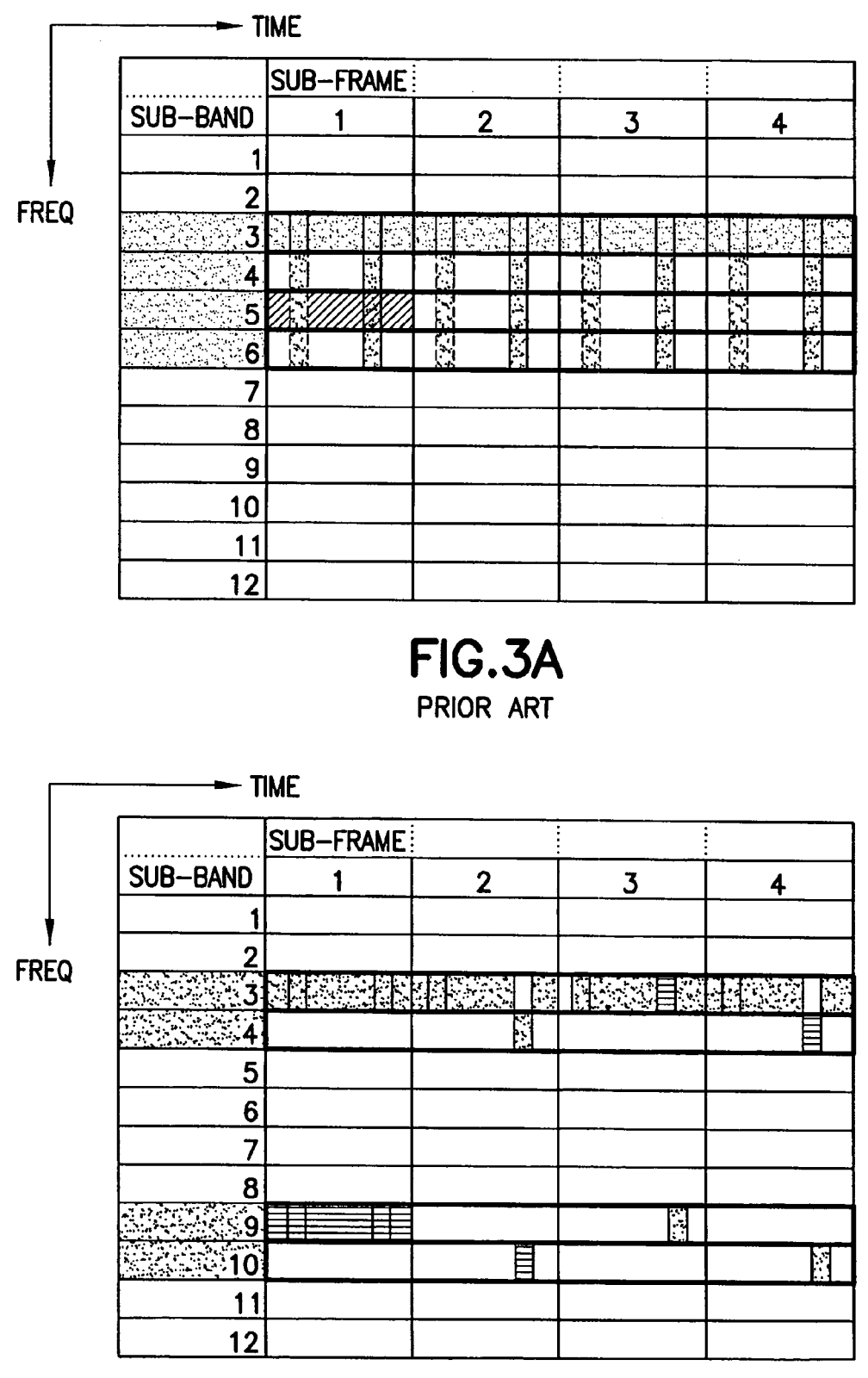

An assumption is made that the CQI rate is constrained or limited, e.g., to 0.5 ms. A non-limiting example of the pilot transmission technique in accordance with the exemplary embodiments of this invention is shown in FIG. 3B.

In the conventional approach (see, e.g., FIG. 3A), there are two blocks (SB1, SB2) reserved for pilot signals in the currently proposed frame format (3GPP LTE UL). In accordance with the exemplary embodiments of this invention, SB1 is defined as the in-band pilot and is transmitted using code #1 (the code list may vary from cell to cell). The hopping pattern and pilot code allocation for SB2 are based on the (sub-frame and sub-band) location of the first SB1 (the first in-band pilot).

The following is a non-limiting example of a frequency hopping pattern generation for SB2.

Two input parameters are used to generate the basic hopping pattern:

L=length of the hopping pattern (a semi-static parameter); and y=hopping pattern index (1 ... L).

If one assumes for this example that L=4, and that z=sub-frame index (1 ... L), then:

Hopping pattern(z)=rem(z−1+(y−1),L)+1

Some modifications to the basic pattern may be made to improve channel estimation support for different bandwidth allocations.

One advantage of this approach is that it supports scheduling over non-adjacent sub-bands. This is important not only from a performance point of view, but also from a flexible spectrum usage point of view. Another advantage is that it provides optimized channel estimation performance. Further, the approach outlined above is optimized from a signaling point of view, it provides sufficient tracking capability for channel sounding, and may be used with any of the three options shown in FIG. 2. In addition, the approach in accordance with the exemplary embodiments of this invention supports the use of a variable length TTI.

Before proceeding further, reference is made first to FIG. 1 for illustrating a simplified block diagram of various electronic devices that are suitable for use in practicing the exemplary embodiments of this invention. In FIG. 1, a wireless network 1 is adapted for communication with a UE 10 via a Node B (base station) 12. The network 1 may include a RNC 14, which may be referred to as a serving RNC (SRNC). The UE 10 includes a data processor (DP) 10A, a memory (MEM) 10B that stores a program (PROG) 10C, and a suitable radio frequency (RF) transceiver 10D for bidirectional wireless communications with the Node B 12 via at least one antenna. The Node B 12 also includes a DP 12A, a MEM 12B that stores a PROG 12C, and a suitable RF transceiver 12D. The Node B 12 is coupled via a data path 13 to the RNC 14 that also includes a DP 14A and a MEM 14B storing an associated PROG 14C. The RNC 14 may be coupled to another RNC (not shown). At least one of the PROGs 10C and 12C is assumed to include program instructions that, when executed by the associated DP, enable the electronic device to operate in accordance with the exemplary embodiments of this invention, as will be discussed below in greater detail.

In general, the various embodiments of the UE 10 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The exemplary embodiments of this invention may be implemented by computer software executable by the DP 10A of the UE 10 and the other DPs, or by hardware, or by a combination of software and hardware.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory, as non-limiting examples. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

As was noted above, the currently considered approaches for the UTRAN-LTE UL (FIG. 3A) involve scheduling over adjacent sub-bands and utilize an unlimited CQI rate. It can be shown that the use of the currently considered approaches would result in inferior channel estimation performance and a limited channel tracking capability (lack of orthogonal codes), as compared with utilizing aspects of the exemplary embodiments of the invention. Further, the currently proposed approaches employ user-specific pilot codes.

In contradistinction, the use of the exemplary embodiments of this invention (FIG. 3B) provides support for scheduling over non-adjacent sub-bands, enable the use of a limited CQI rate (e.g., 0.5 ms), provide optimized channel estimation and provide adequate channel tracking capability. Further, resource-specific pilot codes are employed, as opposed to user-specific pilot codes.

In the ensuing description of FIGS. 4-15 it is assumed for convenience, and not as a limitation, that the CQI rate is limited to 0.5 ms. In other embodiments, a different CQI rate may be used.

FIG. 4 shows an example of data allocation in a scheduled UL system for a number of users (users A, B, C, D, E, F and I). Both TDM and FDM principles are used to multiplex different users within the given time and frequency resource. User allocation (scheduling) may be based on, as a non-limiting example, the instantaneous channel quality. In order to measure the channel quality in a FDD UL system, the out-band/out-time pilot is employed. FIG. 4 assumes that the CQI is collected every 2 ms, which is of the order of the round-trip delay, and thus a faster CQI is likely not required. The overhead that results from the out-band pilot can be maintained at a reasonable level as the rate of the CQI is limited. The usage of the orthogonal pilot resources is also maintained at a reasonable level. Note again that pilot transmission approach in accordance with the exemplary embodiments of this invention supports variable length TTI (e.g., one sub-frame and four sub-frames).

FIG. 4 shows four sub-frames (3, 4, 9, 10) used for scheduling, with a total bandwidth of 4×375 kHz=1.5 MHz (as a non-limiting example). In other embodiments, a different number of sub-frames and/or a different bandwidth may be used, for example.

Figure 5:
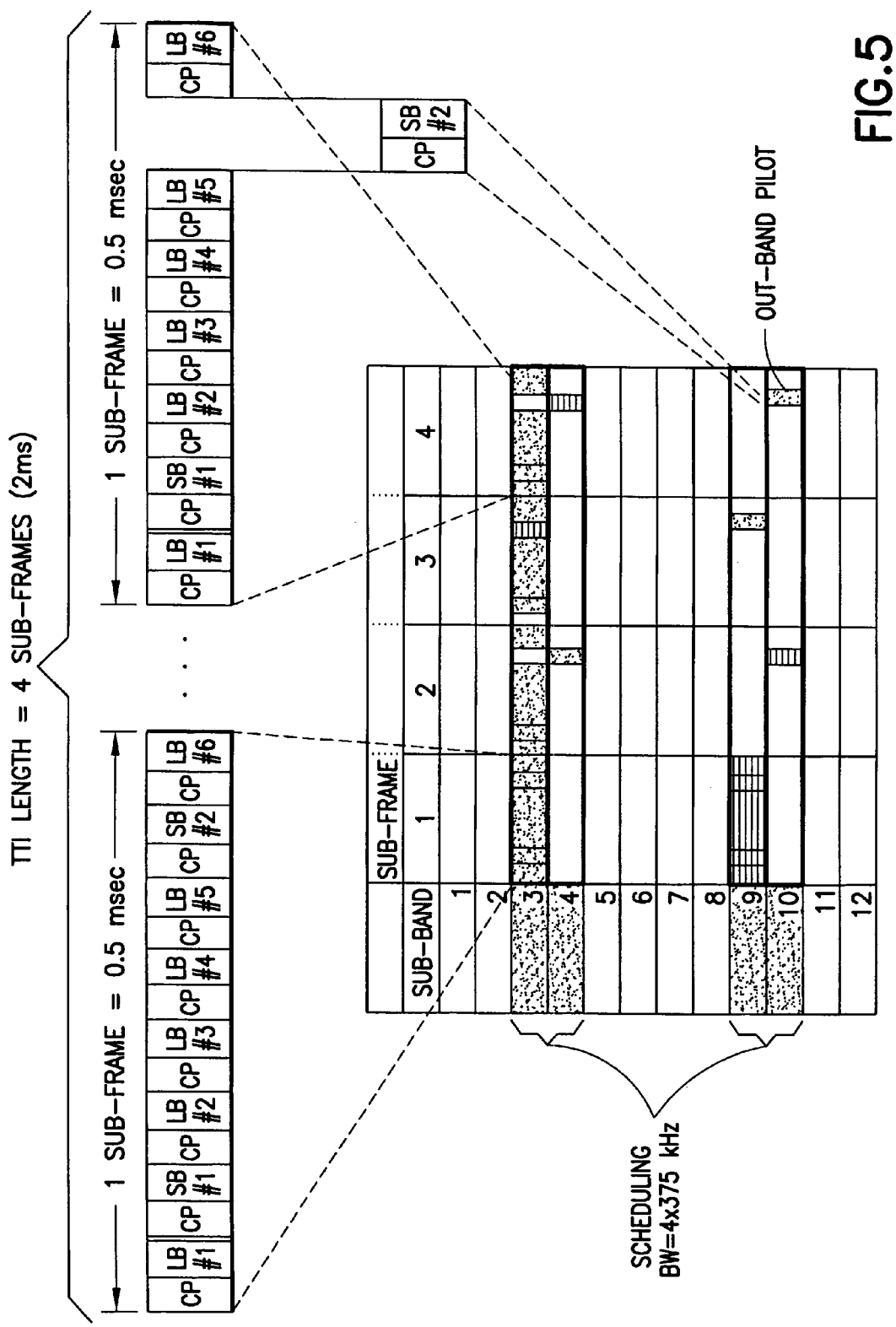
FIG. 5 is a sub-band/sub-frame diagram that pertains to transmission of the out-band pilot.

FIG. 5 pertains to transmission of the out-band pilot. It can be appreciated that the gain from channel dependent frequency domain scheduling is improved by also being able to allocate the non-adjacent sub-bands for scheduling. Further, a low PAR is maintained by restricting the allocated BW only for the adjacent sub-bands. In addition, the hopping patterns for out-band/out-time pilot may be pre-defined, for example.

FIG. 6 shows various (orthogonal) code resources (e.g., codes 1-6) associated with sub-frames and sub-bands, and is useful for explaining exemplary rules for pilot transmission. It also shows that the first pilot block (SB1) is always transmitted using the first code of the code list. It may be assumed that the codes are either Cyclic Shifts of a certain CAZAC code, or are orthogonal frequency pin allocations of Distributed FDMA pilot code (CAZAC), as non-limiting examples. SB1 is generally transmitted using code #1 (the code list may vary from cell to cell). Note that different codes may be needed with different BW options (cyclic shift approach). SB1 is reserved for the in-band pilot. SB2 is used for the out-band pilot except in the sub-frame and sub-band of the first SB1 in which SB2 is also transmitted in-band (this case is shown in FIG. 5 in the first TTI, where it can be observed that both SB1 and SB2 are transmitted in-band, as well as in FIG. 13B). Each user in the scheduling group has a predetermined code and hopping pattern for the out-band/out-time pilot, where, in accordance with the exemplary embodiments of this invention, the code and hopping pattern of scheduled users is defined by the allocated resource. Note that unused codes and hopping patterns can be used by the non-active users (those not active during the scheduling period). It should be noted again that resource-specific pilot codes. (both in-band and out-band) are employed, as opposed to user-specific pilot codes. This beneficially removes the need for additional signaling.

FIGS. 7A, 7B, 7C and 7D illustrate various examples of hopping patterns. Note that different hopping patterns may be generated for different BW allocations, and that the hopping patterns are orthogonal under the same pilot code. It should be appreciated that hopping patterns can be readily generated for different scheduling BW allocations, pilot BW allocations, and also for different CQI rates.

FIGS. 8A, 8B and 8C pertain to the out-band pilot for scheduled (active) users. As was noted above, the hopping pattern and pilot code allocation for SB2 (the out-band pilot) are based on the location of the first SB1 (in-band pilot). The pilot code is selected based on the sub-frame number of the first in-band pilot. For example, when the sub-frame number of the first in-band pilot is #2, then code #2 is selected for SB2. The hopping pattern is selected based on the sub-band number of the first in-band pilot. For example, when the sub-frame number of the first in-band pilot is #3 (code #3) and the corresponding sub-band number is #1, then the hopping pattern is #3.

As can be seen, in this exemplary embodiment of the invention, a hopping pattern is selected which is based on the first active sub-band (e.g., sub-band #1) during the first active sub-frame (e.g., the third sub-frame).

To provide another example:

B=1st active sub-band;
R=1st active sub-frame;
X=hopping pattern;

and the selected hopping pattern meets the following criterion:

$$X(R)=B.$$

FIGS. 9A and 9B pertain to the out-time and out-band pilot for non-scheduled users. As was noted above, the unused codes and hopping patterns can be used by the non-active users (i.e., users who are not active during the scheduling period). The question then arises as to how best to manage the pilot patterns and pilot codes between the active and non-active user. In one exemplary embodiment of the invention, this can be accomplished by reallocating the free resources among the non-active users separately for each scheduling period, and to signal the allocations to the UEs 10 (as shown in FIG. 9A). In another exemplary embodiment, which may be more preferred than the first embodiment, a portion of the pilot resources is pre-reserved for certain users, who then utilize the pre-allocated resources when they are not scheduled for data transmission. This approach is shown in FIG. 9B.

With regard to signaling of the pilot code(s), the following points are noted. The code list (e.g., order of the utilization) is preferably cell-specific. The code list may be signaled, as one non-limiting example, via L3 (Layer 3, Radio Network Layer) signaling. It is beneficial to use different codes as code #1 in different cells because some of the codes may exhibit better orthogonality under a longer timing difference (resistance against other cell interference).

The in-band pilot on SB1 is transmitted using code #1.

There is no need to signal the hopping pattern of the out-band pilot for the scheduled (active) users since the hopping pattern and the code of the out-band pilot is tied to the allocated resource, as was explained above with reference to FIGS. 8A-8C.

The pilot resource of non-active users is signaled to the UE 10 during the resource allocation. The resource may be characterized (e.g., signaled) by two parameters: hopping pattern and code. The resource is selected from all the available resources, where the resources can be used according to the predetermined list (providing robustness against the inter-cell interference of the pilot signals), and the signaling can be minimized by allocating the fixed resources for given users when they have no data to transmit.

Figures 10B, 11:
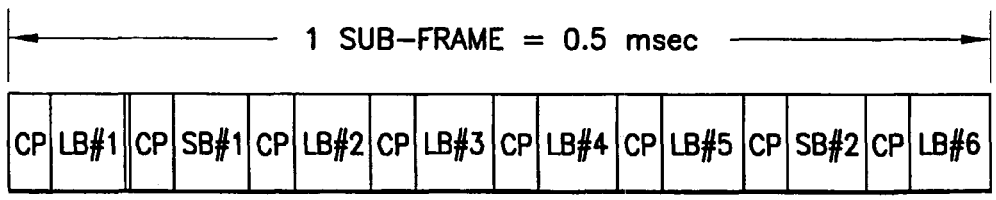

FIGS. 10A and 10B pertain to the generation of the hopping patterns. As was noted above, two input parameters can be used to generate the basic hopping pattern:

L=length of the hopping pattern (a semi-static parameter); and

Y=hopping pattern index (1 ... L).

If one assumes for this example that L=4, and that z=sub-frame index (1 ... L), then hopping pattern (z)=rem(z−1+(y−1),L)+1.

Some modifications to the basic pattern may be made to improve channel estimation support for different BW allocations.

Reference is made to FIG. 11 for the ensuing discussion of the roles of SB1 and SB2. The use of IRC requires that there is a reference signal which is used only by the active users. The interference covariance matrix estimated from the signal containing not only the in-band pilot but also the out-band pilot collapses the IRC gains totally, as the estimated interference covariance matrix no longer reflects the actual interference scenario of data channels. In accordance with the exemplary embodiments of this invention, using SB1 only for the in-band pilot solves the identified problem (SB2 is used for both in-band and out-band pilots), and the error covariance matrix can be calculated from SB1 only. A similar division between the roles of SB1 and SB2 is also beneficial with the TxAA-type of UL MIMO transmission. In this case, SB1 is a beam-specific pilot, as beamforming gain is already available in the channel estimation phase (in-space pilot), and SB2 is an antenna-specific pilot needed to generate beamforming weights (out-space pilot).

With the cyclic shift based approach, it can be noted that the channel tracking capability may be limited compared to the case where SB1 can also be used for the out-band pilot for non-active users (discussed below in relation to FIGS. 12A and 12B). However, this does not present a significant problem since the channel tracking capability is generally very good.

Turning now to FIGS. 12A and 12B for a discussion of the use of SB1 as an out-band pilot, note that if IRC is not used then it is possible to use the orthogonal resources of SB1 for transmission of an out-band pilot. This extends the channel tracking capability by a factor of two, and provides more freedom for pre-allocation of the pilot resources for non-active users (resulting in reduced signaling). In the cyclic shift based approach, it can be noted that if the active user has a larger transmit BW than the minimum transmit BW (e.g., 375 kHz), then the in-band code (SB1) and out-band codes (SB using the transmit BW of 375 kHz) are no longer orthogonal (distributed FDMA-based pilots do not exhibit this type of problem).

Figures 13A, 13B:
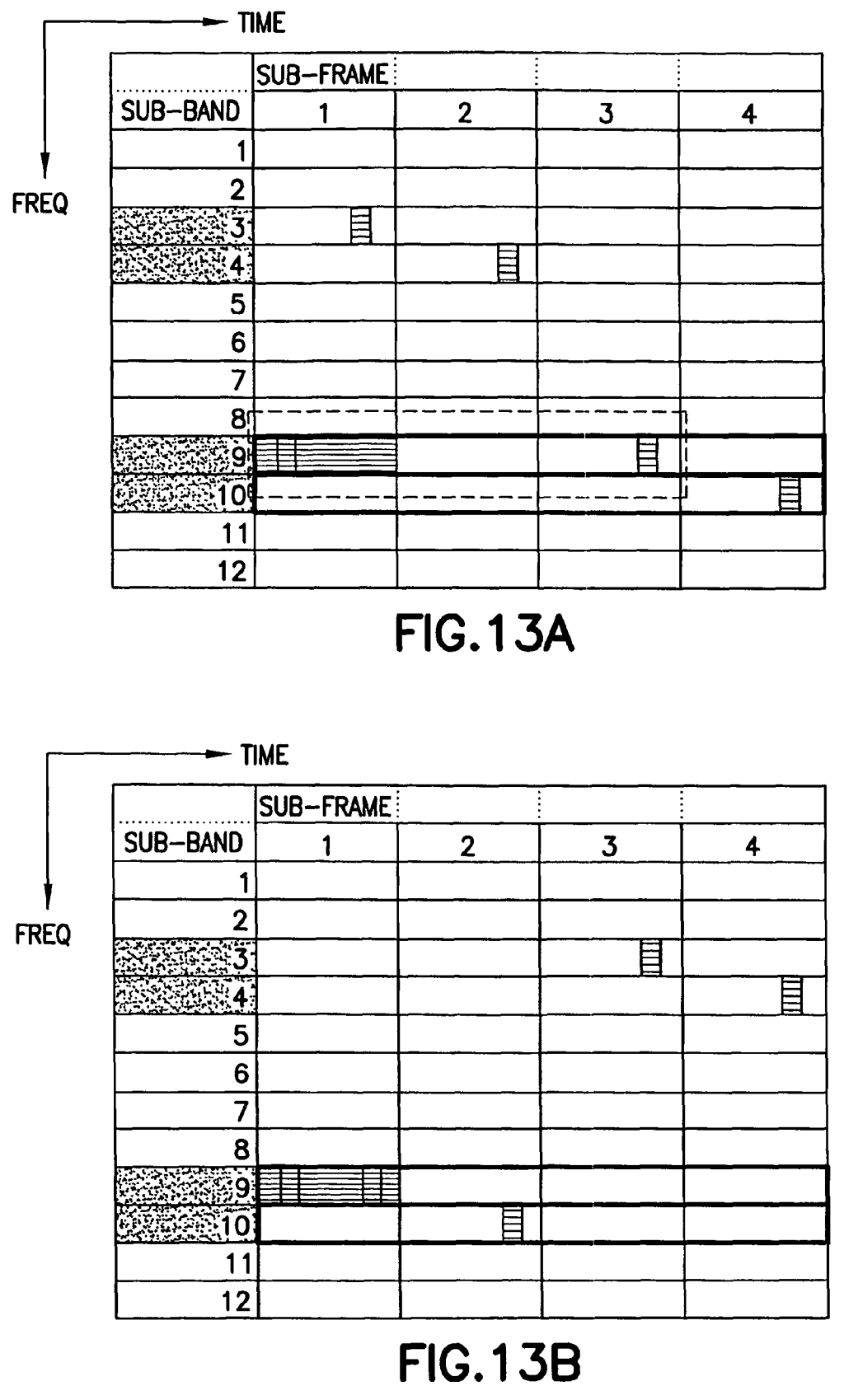

FIGS. 13A and 13B are useful for comparing UE-specific hopping patterns (FIG. 13A) and resource-specific hopping patterns with a hopping out-band pilot (FIG. 13B). With regard to the UE-specific hopping pattern of FIG. 13A, note that the in-band pilot is not matched for the data transmission, additional delay can be required for detection, and problems can be experienced with high Doppler frequency shifts. However, as shown in FIG. 13B, with the resource-specific hopping pattern in accordance with the exemplary embodiments of this invention, the in-band pilot is always matched to the data transmission in an optimized way.

FIGS. 14 and 15 pertain to the use of pilot signals in a (possibly) multi-antenna MIMO system. It can be noted that the MIMO case is just a simple extension of the exemplary embodiments of this invention that have been discussed above. The SB1 of antenna #1 is transmitted using code #1 (SIMO) and the SB1 of antennas #2 is transmitted using code #2. With a MIMO transmission, the transmission of the out-band pilot is done similarly as in the case of single antenna transmission, and the hopping patterns and pilot codes of SB2 are tied to the used resources. Both antennas use the same hopping pattern, and different antennas utilize different pilot codes. The same principles apply for both multi-antenna MIMO and Virtual MIMO. It can be noted that in a MIMO application, the CQI rate can be decreased when the system exhausts the orthogonal pilot resources.

Based on the foregoing it should be apparent that the exemplary embodiments of this invention provide methods, apparatus and computer program products to operate the UE 10 to selectively transmit UL pilot signals during sub-bands and slots, where at least two blocks (block 1 and block 2) are reserved for pilot signals, where block 1 is defined as an in-band pilot signal and is transmitted using a first pilot code, and where a frequency hopping pattern and pilot code allocation for block 2 are based on a slot and a sub-band in which a first block 2 is transmitted. The frequency hopping pattern for block 2 may be based on parameters: L=length of the hopping pattern and y=hopping pattern index (1 ... L), where z=slot index (1 ... L), and the Hopping pattern (z)=rem(z−1+(y−1),L)+1. In an exemplary embodiment of this invention, the UL is a UTRAN-LTE UL. In another exemplary embodiment of the invention, block 1 comprises two long blocks (LBs), LB1 and LB2, and block 2 comprises a third long block, LB3.

In one non-limiting, exemplary embodiment, and as shown in FIG. 16, a method comprises: transmitting uplink pilot signals during sub-bands and slots, wherein at least three blocks (LB1, LB2 and LB3) are reserved for pilot signals, wherein LB1 and LB2 comprise in-band pilot signals transmitted using a dedicated pilot code (box 162); and transmitting LB3 using a frequency hopping pattern and pilot code allocation that are based on a slot and a sub-band in which a first LB3 is transmitted (box 164).

In other embodiments, the frequency hopping pattern for LB3 is based on parameters comprising: L=length of the hopping pattern and y=hopping pattern index (1 . . . L), wherein z=slot index (1 . . . L), and wherein the Hopping pattern (z)=rem(z−1+(y−1),L)+1. In further embodiments, the frequency hopping pattern (X) for LB3 meets the following criterion: X(R)=B, where B=1st active sub-band; and R=1st active slot. In other embodiments, the dedicated pilot code comprises a code in a code list. In further embodiments, codes in the code list comprise cyclic shifts of a constant amplitude zero autocorrelation (CAZAC) code. In further embodiments, codes in the code list comprise orthogonal frequency pin allocations of a Distributed FDMA pilot code (constant amplitude zero autocorrelation—CAZAC). In other embodiments, the dedicated pilot code comprises a first code in a code list.

In other embodiments, LB3 comprises an out-band pilot except in a slot and sub-band in which a first LB1 and/or LB2 is transmitted, wherein in the slot and sub-band in which the first LB1 and/or LB2 is transmitted LB3 is also transmitted in-band. In further embodiments, each user equipment in a scheduling group has a predetermined code and hopping pattern for the out-band pilot, wherein the code and hopping pattern of a scheduled user equipment are defined by an allocated resource. In other embodiments, unused codes and hopping patterns are useable by non-active user equipments. In further embodiments, the uplink comprises a universal terrestrial radio access network-long term evolution (UTRAN-LTE) uplink, and wherein a CQI rate is constrained.

In another non-limiting, exemplary embodiment, a user equipment comprises: a data processor; and a wireless transceiver configured to transmit uplink pilot signals during subbands and slots, wherein at least three blocks (LB1, LB2 and LB3) are reserved for pilot signals, wherein LB1 and LB2 comprise in-band pilot signals transmitted using a dedicated pilot code, and to transmit LB3 using a frequency hopping pattern and pilot code allocation that are based on a slot and a sub-band in which a first LB3 is transmitted.

In a further non-limiting, exemplary embodiment, a user equipment comprises: processing means; and transmitting means for transmitting uplink pilot signals during sub-bands and slots, wherein at least three blocks (LB1, LB2 and LB3) are reserved for pilot signals, wherein LB1 and LB2 comprise in-band pilot signals transmitted using a dedicated pilot code, and for transmitting LB3 using a frequency hopping pattern and pilot code allocation that are based on a slot and a sub-band in which a first LB3 is transmitted.

In other embodiments, the means for processing comprises a data processor and the transmitting means comprises at least one transmitter or at least one transceiver.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

While the exemplary embodiments have been described above in the context of a UTRAN-LTE system, it should be appreciated that the exemplary embodiments of this invention are not limited for use with only this one particular type of wireless communication system, and that they may be used to advantage in other wireless communication systems.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, sub-frame/sub-band diagrams, or by using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The exemplary embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims.

For example, the use of the exemplary embodiments of this invention is not limited to only the specific numbers of sub-band, sub-frames and codes that were discussed above and shown in the drawings. Further by example, the use of the exemplary embodiments of this invention is not limited to only the use of two SBs, as more than two could be employed with suitable modifications to the foregoing exemplary embodiments.

Furthermore, while described above with respect to short blocks (SBs), sub-bands and sub-frames, the exemplary embodiments of the invention are not limited to only this one type of system. For example, the exemplary embodiments of the invention may be utilized in conjunction with long blocks (LBs), sub-bands and slots.

A further non-limiting example of a system within which the exemplary embodiments may be utilized is described here. The SBs are replaced by LBs. One sub-frame includes two slots, each slot having a length of 0.5 ms, for example. Each subframe includes two pilot LBs (LB1 and LB2; e.g., for a demodulation reference signal (RS)) and may include an optional third LB (LB3) which may also be referred to as a sounding LB. LB3 is used for transmitting out-band/out-time reference signals (RS). LB3 may be periodic and also may be subject to frequency hopping (FH) as described in greater detail above. In accordance with the exemplary embodiments of the invention, the signaling of LB3 may be performed, for example, using radio link control (RLC) signaling without explicitly signaling the FH pattern.

However, all such and similar modifications of the teachings of this invention will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
composing, by a data processor, first uplink pilot signals and a second uplink pilot signal;
transmitting, by at least one transmitter, the first uplink pilot signals during sub-bands and slots of a time-frequency resource space, wherein at least three first portions of the time-frequency resource space (a first long block 1 (LB1), a first long block 2 (LB2) and a first long block 3 (LB3)) are reserved for the first uplink pilot signals, wherein the first LB1 and the first LB2 comprise in-band pilot signals transmitted using a dedicated pilot code; and
transmitting, by the at least one transmitter, the second uplink pilot signal during a second portion of the time-frequency resource space (a second long block 3 (LB3)) using a frequency hopping pattern and a pilot code allocation that are based on a slot and a sub-band in which the first LB3 is transmitted.

2. The method of claim 1, wherein the frequency hopping pattern for the second LB3 is based on parameters comprising: L=length of the hopping pattern and y=hopping pattern index (1 . . . L), wherein z=slot index (1 . . . L), and wherein the hopping pattern (z)=rem(z−1+(y−1),L)+1.

3. The method of claim 1, wherein the frequency hopping pattern (X) for the second LB3 meets the following criterion:

$$X(R)=B,$$

where
B=first active sub-band; and
R=first active slot.

4. The method of claim 1, wherein the dedicated pilot code comprises a code in a code list.

5. The method of claim 4, wherein codes in the code list comprise cyclic shifts of a constant amplitude zero autocorrelation (CAZAC) code.

6. The method of claim 1, wherein the uplink comprises a universal terrestrial radio access network-long term evolution (UTRAN-LTE) uplink, and wherein a channel quality indication rate for at least the second uplink pilot signal is constrained.

7. A tangible computer-readable medium that stores program instructions, execution of the program instructions by a processor resulting in operations comprising:
composing first uplink pilot signals and a second uplink pilot signal;
transmitting the first uplink pilot signals during sub-bands and slots of a time-frequency resource space, wherein at least three first portions of the time-frequency resource space (a first long block 1 (LB1), a first long block 2 (LB2) and a first long block 3 (LB3)) are reserved for the first uplink pilot signals, wherein the first LB1 and the first LB2 comprise in-band pilot signals transmitted using a dedicated pilot code; and
transmitting the second uplink pilot signal during a second portion of the time-frequency resource space (a second long block 3 (LB3)) using a frequency hopping pattern and a pilot code allocation that are based on a slot and a sub-band in which the first LB3 is transmitted.

8. The computer-readable medium of claim 7, wherein the frequency hopping pattern for the second LB3 is based on parameters comprising: L=length of the hopping pattern and y=hopping pattern index (1 . . . L), wherein z=slot index (1 . . . L), and wherein the hopping pattern (z)=rem(z−1+(y−1),L)+1.

9. The computer-readable medium of claim 7, wherein the frequency hopping pattern (X) for the second LB3 meets the following criterion:

$$X(R)=B,$$

where
B=first active sub-band; and
R=first active slot.

10. The computer-readable medium of claim 7, wherein the dedicated pilot code comprises a code in a code list.

11. The computer-readable medium of claim 10, wherein codes in the code list comprise cyclic shifts of a constant amplitude zero autocorrelation (CAZAC) code.

12. The computer-readable medium of claim 7, wherein the uplink comprises a universal terrestrial radio access network-long term evolution (UTRAN-LTE) uplink, and wherein a channel quality indication rate for at least the second uplink pilot signal is constrained.

13. An apparatus comprising:
a data processor configured to compose first uplink pilot signals and a second uplink pilot signal; and
a transmitter configured to transmit the first uplink pilot signals during sub-bands and slots of a time-frequency resource space, wherein at least three portions of the time-frequency resource space (a first long block 1 (LB1), a first long block 2 (LB2) and a first long block 3 (LB3)) are reserved for the first uplink pilot signals, wherein the first LB1 and the first LB2 comprise in-band pilot signals transmitted using a dedicated pilot code, wherein the transmitter is further configured to transmit a the second uplink pilot signal during a second portion of the time-frequency resource space (a second long block 3 (LB3)) using a frequency hopping pattern and a pilot code allocation that are based on a slot and a sub-band in which the first LB3 is transmitted.

14. The apparatus of claim 13, wherein the frequency hopping pattern for the second LB3 is based on parameters comprising: L=length of the hopping pattern and y=hopping pattern index (1 . . . L), wherein z=slot index (1 . . . L), and wherein the hopping pattern (z)=rem(z−1+(y−1),L)+1.

15. The apparatus of claim 13, wherein the frequency hopping pattern (X) for the second LB3 meets the following criterion:

$$X(R)=B,$$

where
B=first active sub-band; and
R=first active slot.

16. The apparatus of claim 13, wherein the dedicated pilot code comprises a code in a code list.

17. The apparatus of claim 16, wherein codes in the code list comprise cyclic shifts of a constant amplitude zero autocorrelation (CAZAC) code.

18. The apparatus of claim 13, wherein the uplink comprises a universal terrestrial radio access network-long term evolution (UTRAN-LTE) uplink, and wherein a channel quality indication rate for at least the second uplink pilot signal is constrained.

19. The apparatus of claim 13, wherein the apparatus comprises a mobile phone.

20. The apparatus of claim 13, embodied at least partially in an integrated circuit.

21. An apparatus comprising:

processing means for composing first uplink pilot signals and a second uplink pilot signal; and transmitting means for transmitting the first uplink pilot signals during sub-bands and slots of a time-frequency resource space, wherein at least three portions of the time-frequency resource space (a first long block 1 (LB1), a first long block 2 (LB2) and a first long block 3 (LB3)) are reserved for the first uplink pilot signals, wherein the first LB1 and the first LB2 comprise in-band pilot signals transmitted using a dedicated pilot code, wherein the transmitting means is further for transmitting the second uplink pilot signal during a second portion of the time-frequency resource space (a second long block 3 (LB3)) using a frequency hopping pattern and a pilot code allocation that are based on a slot and a sub-band in which the first LB3 is transmitted.

22. The apparatus of claim 21, wherein the processing means comprises a data processor and the transmitting means comprises at least one transmitter or at least one transceiver.

23. The apparatus of claim 21, wherein the frequency hopping pattern for the second LB3 is based on parameters comprising: L=length of the hopping pattern and y=hopping pattern index (1 . . . L), wherein z=slot index (1 . . . L), and wherein the hopping pattern (z)=rem(z−1+(y−1),L)+1.

24. The apparatus of claim 21, wherein the frequency hopping pattern (X) for the second LB3 meets the following criterion:

$$X(R)=B,$$

where

B=first active sub-band; and

R=first active slot.

25. The apparatus of claim 21, wherein the dedicated pilot code comprises a code in a code list, wherein codes in the code list comprise cyclic shifts of a constant amplitude zero autocorrelation (CAZAC) code.

* * * * *